March 14, 1933. K. W. PALMAER 1,900,996
METHOD OF REMOVING ONE OR MORE OF THE METALS OF THE IRON GROUP FROM
SOLUTIONS CONTAINING SALTS OF ONE OR MORE OF THE SAID METALS
Filed Aug. 12, 1929
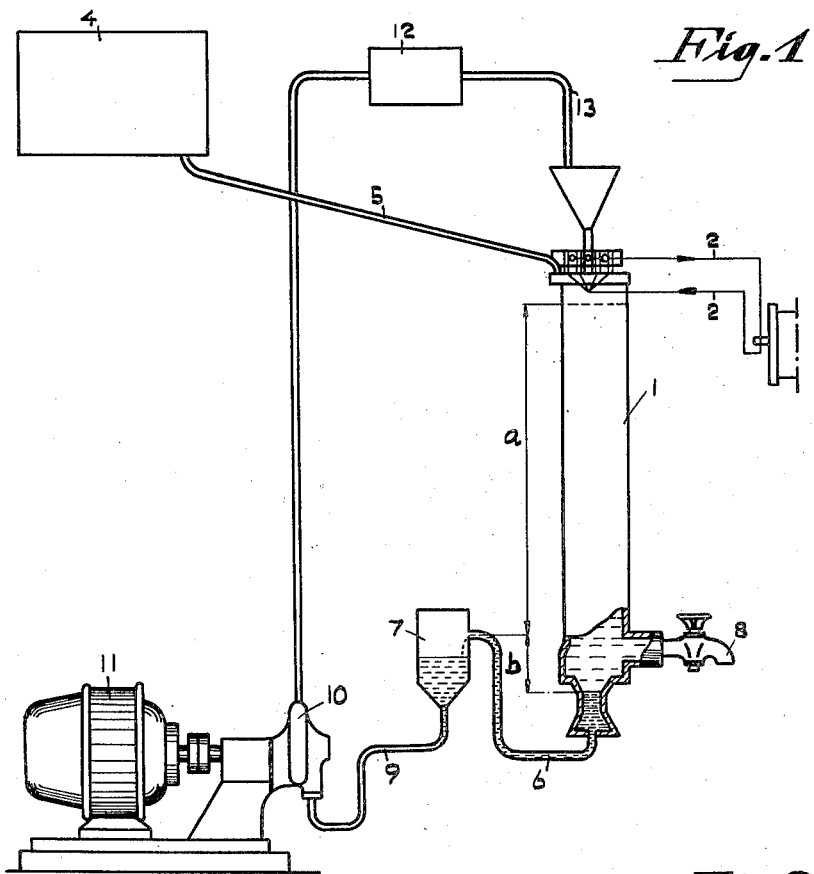
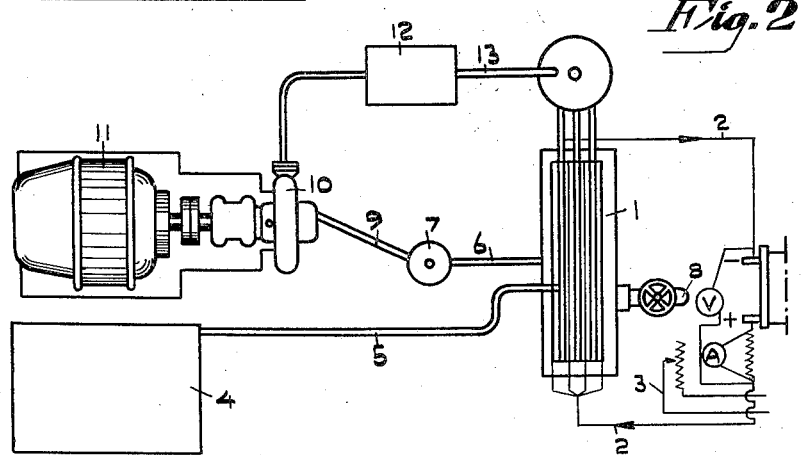

Patented Mar. 14, 1933

1,900,996

UNITED STATES PATENT OFFICE

KNUT WILHELM PALMAER, OF STOCKHOLM, SWEDEN

METHOD OF REMOVING ONE OR MORE OF THE METALS OF THE IRON GROUP FROM SOLUTIONS CONTAINING SALTS OF ONE OR MORE OF THE SAID METALS

Application filed August 12, 1929, Serial No. 385,466, and in Sweden August 23, 1928.

The metals of the iron group, e. g. iron and nickel, are soluble in mercury in rather considerable quantities provided that perfectly pure surfaces of the said metals freed from oxide films and other covers are brought into contact with the mercury.

This circumstance may be utilized in several ways for the extraction of the iron group metals from different materials containing said metals.

The present invention relates to a method of removing one or more of the metals of the iron group from solutions containing salts of one or more of the said metals by electrolysis with the use of a cathode consisting of mercury which is kept in motion and preferably made to flow, and is characterized in that the mercury is caused to flow at such a rate with regard to the current density that the deposited metal is completely removed by the mercury in amalgamated form without appearing as a film or coating on the cathode surface at the current density used. In the preferred embodiment the mercury is caused to flow in a vertical or inclined direction so as to present vertical or inclined active surface.

The general rule is that the voltage necessary for precipitating hydrogen on a mercury cathode from an acid solution of a certain hydrogen ion concentration is higher than the voltage which is needed for precipitating one or more of the iron group metals from the corresponding metal salt solutions of equivalent metal ion concentration.

Assuming that the voltage which is necessary to preciptate hydrogen on platinum from a 1-normal acid solution is put down as zero according to Nernst's suggestion, the following empirically ascertained constants hold true:

The voltage required for precipitating hydrogen on iron from a 1-normal acid solution is 0.08 volt.

The voltage necessary for precipitating hydrogen on mercury from a 1-normal acid solution is about 0.8 volt.

When precipitating hydrogen from a neutral solution these numbers are increased by 0.41 volt.

The voltage necessary for precipitating iron from a ferro-salt solution containing one gramme-ion (56 grams) ferro-ions to the litre is 0.43 volt. For a ferro-salt solution containing 0.001 gramme-ion ferro-ions to the litre the corresponding voltage is 0.52 volt, independent of the cathode material.

It is common to all the metals of the iron group that the voltage which is necessary for precipitating hydrogen on a mercury cathode is considerably higher than the voltage required for precipitating the metal in question on condition that the solutions are of equivalent gramme-ion concentrations. Further the potential required for precipitating hydrogen on the metals in question is substantially lower than the potential required for precipitating hydrogen on mercury.

From the afore-said it is evident that in a solution containing one or more of the iron group metals practically every trace of metal may be removed by electrolysis with the use of a mercury cathode without hydrogen being evolved at the cathode in substantial quantity.

Certain metals, as known, are reduced at the cathode to their lowest degree of oxidation by the electrolysis before metal is precipitated. Often it is, however, of great advantage to effect such a reduction by means of a suitable reducing agent before starting the electrolysis.

From the above theoretical explanation it will be evident as well, that it is a necessary condition for suppressing the evolution of hydrogen that the mercury surface should not be covered by the precipitated metal, because in such a case a cathode consisting of one or more of the iron group metals is obtained, which according to the afore-said will cause an immediate considerable increase in the evolution of hydrogen and a corresponding decrease of the current efficiency with respect to the metal or metals. By using mercury as cathode material this drawback is avoided in consequence of mercury having a liquid state of aggregation at normal temperature and owing to the above-mentioned capability of mercury of dissolving the metals in question. By means of a cathode consisting of mercury which is kept in motion and preferably made to flow it is thus possible, by regulating the rate of flow of the mercury with regard to the current density to regulate the course of the electrolysis so that the deposited metal is completely removed by the mercury in amalgamated form without appearing as a film or coating on the cathode surface at the current density used.

The invention is particularly suitable for the manufacture of iron-free aluminium salts. On treating clay or other aluminium-bearing minerals with acids aluminium as well as considerable quantities of iron are dissolved which latter contaminate the extracted aluminium salts. Several methods of removing iron from these salt solutions have been suggested without, however, solving the problem from a technical-economical stand-point.

According to the invention lead is preferably used as anode material for the electrolysis of an aluminium sulphate solution containing iron salts which may have been previously reduced in any suitable manner. Said lead anode may, if desired, be surrounded with a suitable diaphragm in order to prevent the falling down of lead superoxide. When electrolyzing aluminium chloride solution carbon is preferably used as anode material.

As set forth in the beginning of this specification the precipitation potential of hydrogen increases with decreasing acidity. From this fact it may be easily concluded that the electrolytes, whether they consist of aluminium salt solutions or other solutions, should be kept as nearly neutral as possible in order to secure a good current efficiency. Before the electrolysis one may therefore, if desired, decrease the acidity of the solutions by the addition of suitable neutralizing agents such as for instance $CaCO_3 Al(OH)_3$ etc. By the addition of $CaCO_3$ the acidity in a solution of aluminium sulphate which is acid due to hydrolysis may be reduced to about 0.0001-normal.

A suitable device for carrying out the process according to the invention is described in the following with reference to the attached drawing in which Fig. 1 is a side elevation and Fig. 2 a plan of an installation according to the invention.

The electrolysis takes place in the cell 1 which comprises a number of cathodes consisting of mercury flowing over suitable bearers or supports, as well as a corresponding number of anodes. The cathodes and anodes are connected to the current conductors 2 which are, in their turn, connected to a suitable current generator. V and A designate a voltmeter and an amperemeter respectively. 3 is an adjustable resistance for regulating the current. The solution to be electrolyzed is conveyed from the container 4 through the pipe 5 to the electrolytic cell 1. The liquid introduced through the pipe 5 is subjected to electrolysis in the electrolytic cell, the deposited metals being taken up and carried away in amalgamated state by the flowing cathode mercury.

The power portion of the electrolytic cell is connected with one end of a U-tube 6, the other end of which opens out into a vessel 7. The contaminated cathode mercury flows off through this U-tube. The level on which one shank of the tube 6 is joined to the vessel 7 is taken so that the column of mercury of the height $b$ in tube 6 is sufficient, according to the law of communicating vessels, to counter-balance the column of electrolyte of the height $a+b$ in the cell 1. Hence no electrolyte will flow off together with mercury through the tube 6 and the whole quantity of electrolyte may be drawn off through the cock 8 after the electrolyzing process has been completed.

From the vessel 7 the mercury flows through a pipe 9 to a centrifugal pump 10 driven by an electromoter 11, which pump raises the mercury to the purifying vessel 12. The mercury is continuously supplied to said vessel 12 by the pump. In the vessel 12 the contaminated mercury is subjected to the action of a suitable agent or means for removing metal taken up by said mercury. From the vessel 12 the purified mercury flows back through a pipe 13 to the electrolytic cell where it is caused to flow along the bearers or supports acting as cathode.

The following experiment was made:

A quantity of 100 cm³ aluminium sulphate solution, containing about 100 gr. aluminium and 3.45 gr. iron (mainly as bivalent iron) to the litre, said solution having been previously reduced and neutralized by the addition of 100 gr. $CaCO_3$ to the litre, was electrlyzed for 50 minutes with the use of a flowing mercury cathode. The average voltage was 6.2 volts, the current-strength 0.60 amp., the cathode surface 20 cm², thus the current density 3 amp. to the square decimeter. At the end of the experiment the iron percentage had fallen to 0.048 gr. to the litre, i. e., the iron percentage had been decreased from 3.45% to 0.48% calculated on the quantity of $Al_2O_3$ contained in the solution. The current efficiency became thus $$\frac{(3.45-0.048) \times 0.1 \times 96500 \times 100}{28 \times 3600 \times \frac{50}{60} \times 0.6} = 65.1\%$$

One condition for a technical-economical working of the invention is of course that the metal or metals precipitated from the solution and dissolved in mercury may afterwards be removed from the mercury continually and/or intermittently so that said mercury may circulate in the process as extracting, respectively cathode material. For such reasons the mercury is freed from dissolved metal for instance by treating with a solution of mercurous nitrate or in any other suitable way, and is then reconveyed to the process.

The above embodiment has only been cited by way of example, as the method according to the invention may be varied in many ways within the limits of the claims.

What I claim as new and desire to secure by Letters Patent of the United States of America is:

1. In a process for removing one or more metals of the iron group from solutions containing salts of such metals by electrolysis with a cathode consisting of continuously flowing mercury, the improvement which comprises causing the mercury to flow at such a rate with regard to the current density that the deposited metal is completely removed by the mercury in amalgamated form without appearing as a film or coating on the cathode surface at the current density used.

2. In a process for removing one or more metals of the iron group from solutions containing salts of such metals by electrolysis with a cathode consisting of mercury continuously flowing in a vertical or inclined direction so as to present a vertical or inclined active surface, the improvement which comprises causing the mercury to flow at such a rate with regard to the current density that the deposited metal is completely removed by the mercury in amalgamated form without appearing as a film or coating on the cathode surface at the current density used.

In testimony whereof I affix my signature.

KNUT WILHELM PALMAER.